United States Patent
Airaud et al.

(10) Patent No.: US 10,725,964 B2
(45) Date of Patent: Jul. 28, 2020

(54) DYNAMIC SIMD INSTRUCTION ISSUE TARGET SELECTION

(71) Applicant: Arm Limited, Cambridge (GB)

(72) Inventors: Cedric Denis Robert Airaud, Saint Laurent du Var (FR); Luca Nassi, Antibes (FR); Damien Robin Martin, Alpes-Maritimes (FR); Xiaoyang Shen, Alpes-Maritimes (FR)

(73) Assignee: Arm Limited, Cambridge (GB)

( * ) Notice: Subject to any disclaimer, the term of this patent is extended or adjusted under 35 U.S.C. 154(b) by 226 days.

(21) Appl. No.: 16/005,790

(22) Filed: Jun. 12, 2018

(65) Prior Publication Data
US 2019/0377706 A1 Dec. 12, 2019

(51) Int. Cl.
*G06F 15/80* (2006.01)
*G06F 1/3293* (2019.01)
*G06F 9/30* (2018.01)
*G06F 9/38* (2018.01)

(52) U.S. Cl.
CPC ........ *G06F 15/8015* (2013.01); *G06F 1/3293* (2013.01); *G06F 9/30036* (2013.01); *G06F 9/3887* (2013.01)

(58) Field of Classification Search
CPC ... G06F 9/3887; G06F 1/3293; G06F 15/8015
See application file for complete search history.

(56) References Cited

U.S. PATENT DOCUMENTS

2014/0136816 A1* 5/2014 Krig ................... G06F 15/8007
712/15

FOREIGN PATENT DOCUMENTS

EP          1873627 A1 * 1/2008 ........... G06F 9/3891

* cited by examiner

*Primary Examiner* — Farley Abad
(74) *Attorney, Agent, or Firm* — Nixon & Vanderhye P.C.

(57) ABSTRACT

Apparatuses and methods of data processing are disclosed. An apparatus comprises two data processing clusters each having multiple data processing lanes to perform single instruction multiple data (SIMD) processing. Decoded instructions are issued to at least one of the two data processing clusters. A decoded SIMD instruction specifying a vector length which is more than the width of the data processing lanes of the first data processing cluster has a first part issued to the first data processing cluster for execution. An issuance target for a second remaining part of the decoded SIMD instruction is selected in dependence on a dynamic performance condition. When the dynamic performance condition has a first state the issuance target is the first data processing cluster and when the dynamic performance condition has a second state the issuance target is the second data processing cluster. When the issuance target is the first data processing cluster, to schedule the first and second parts of the decoded SIMD instruction in series.

16 Claims, 7 Drawing Sheets

DYNAMIC SIMD INSTRUCTION ISSUE TARGET SELECTION

TECHNICAL FIELD

The present disclosure relates to data processing. In particular, the present disclosure relates to a data processing apparatus configured to execute SIMD instructions.

DESCRIPTION

A data processing apparatus may be arranged to perform single instruction multiple data (SIMD) processing, according to which, in response to a SIMD instruction specifying at least one data value for processing, the apparatus performs parallel processing of multiple sub-units of the data value. The combined width of the multiple sub-units is referred to as the vector length. Although a data processing apparatus will evidently have a maximum vector length, for which it can process multiple sub-units in parallel, the apparatus may also be capable of performing parallel processing of multiple data-value sub-units which have a combined width which is less than the maximum vector length which is supported.

SUMMARY

In one example embodiment described herein there is an apparatus comprising: a first data processing cluster arranged to perform single instruction multiple data (SIMD) processing comprising a first plurality of data processing lanes, wherein the first plurality of data processing lanes has a first width; a second data processing cluster arranged to perform SIMD processing comprising a second plurality of data processing lanes, wherein the second plurality of data processing lanes has a second width; issue circuitry to issue decoded instructions to at least one of the first data processing cluster and the second data processing cluster, wherein the issue circuitry is responsive to receipt of a decoded SIMD instruction specifying a vector length which is more than the first width: to issue a first part of the decoded SIMD instruction having the first width to the first data processing cluster for execution; to select an issuance target for a second part of the decoded SIMD instruction having a remainder width of the vector length less the first width in dependence on a dynamic performance condition, wherein when the dynamic performance condition has a first state the issuance target is the first data processing cluster and when the dynamic performance condition has a second state the issuance target is the second data processing cluster; and when the issuance target is the first data processing cluster, to schedule the first and second parts of the decoded SIMD instruction in series.

In one example embodiment described herein there is a method of data processing comprising: performing single instruction multiple data (SIMD) processing in a first data processing cluster comprising a first plurality of data processing lanes, wherein the first plurality of data processing lanes has a first width; performing SIMD processing in a second data processing cluster comprising a second plurality of data processing lanes, wherein the second plurality of data processing lanes has a second width; issuing decoded instructions to at least one of the first data processing cluster and the second data processing cluster; and in response to receipt of a decoded SIMD instruction specifying a vector length which is more than the first width: issuing a first part of the decoded SIMD instruction having the first width to the first data processing cluster for execution; selecting an issuance target for a second part of the decoded SIMD instruction having a remainder width of the vector length less the first width in dependence on a dynamic performance condition, wherein when the dynamic performance condition has a first state the issuance target is the first data processing cluster and when the dynamic performance condition has a second state the issuance target is the second data processing cluster; and scheduling the first and second parts of the decoded SIMD instruction in series when the issuance target is the first data processing cluster.

In one example embodiment described herein there is an apparatus comprising: first means for performing single instruction multiple data (SIMD) processing comprising a first plurality of data processing lanes, wherein the first plurality of data processing lanes has a first width; second means for performing SIMD processing comprising a second plurality of data processing lanes, wherein the second plurality of data processing lanes has a second width; means for issuing decoded instructions to at least one of the first means for performing SIMD processing and the second means for performing SIMD processing; and in response to receipt of a decoded SIMD instruction specifying a vector length which is more than the first width for causing activation of: means for issuing a first part of the decoded SIMD instruction having the first width to the first means for performing SIMD processing for execution; means for selecting an issuance target for a second part of the decoded SIMD instruction having a remainder width of the vector length less the first width in dependence on a dynamic performance condition, wherein when the dynamic performance condition has a first state the issuance target is the first means for performing SIMD processing and when the dynamic performance condition has a second state the issuance target is the second means for performing SIMD processing; and means for scheduling the first and second parts of the decoded SIMD instruction in series when the issuance target is the first means for performing SIMD processing.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
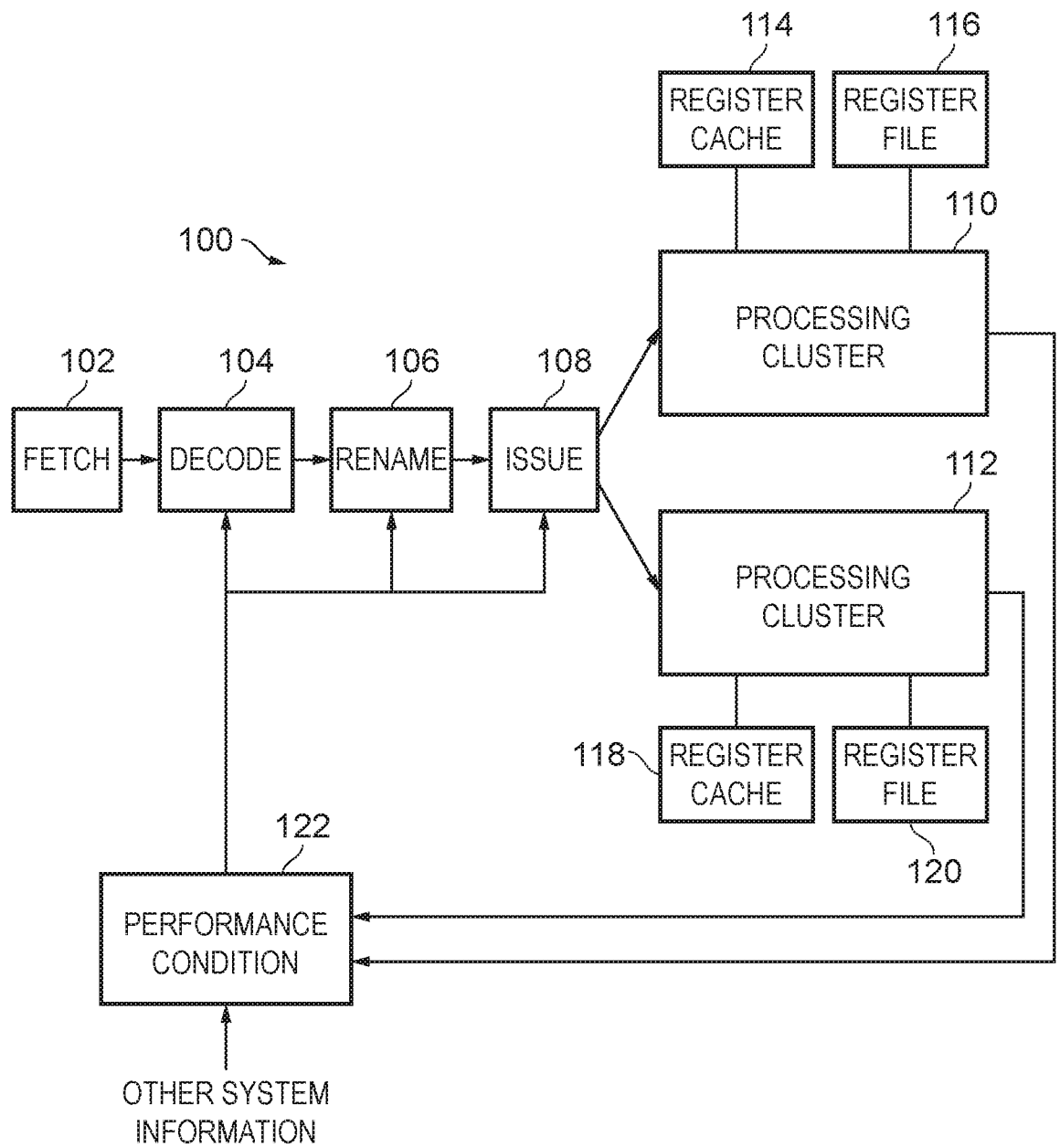
FIG. 1 schematically illustrates a data processing apparatus comprising two processing clusters in one example embodiment.

Before discussing the embodiments with reference to the accompanying figures, the following description of embodiments is provided.

In accordance with one example configuration there is provided an apparatus comprising: a first data processing cluster arranged to perform single instruction multiple data (SIMD) processing comprising a first plurality of data processing lanes, wherein the first plurality of data processing lanes has a first width; a second data processing cluster arranged to perform SIMD processing comprising a second plurality of data processing lanes, wherein the second plurality of data processing lanes has a second width; issue circuitry to issue decoded instructions to at least one of the first data processing cluster and the second data processing cluster, wherein the issue circuitry is responsive to receipt of a decoded SIMD instruction specifying a vector length which is more than the first width: to issue a first part of the decoded SIMD instruction having the first width to the first data processing cluster for execution; to select an issuance target for a second part of the decoded SIMD instruction having a remainder width of the vector length less the first width in dependence on a dynamic performance condition, wherein when the dynamic performance condition has a first state the issuance target is the first data processing cluster and when the dynamic performance condition has a second state the issuance target is the second data processing cluster; and when the issuance target is the first data processing cluster, to schedule the first and second parts of the decoded SIMD instruction in series.

The apparatus comprises parallel data processing lanes which are capable of performing data processing operations on respective portions of data values specified by the SIMD instructions which the apparatus executes. In accordance with the present techniques, these lanes are organised into (at least) a first group and a second group, with these groups being referred to as data processing clusters. The apparatus is responsive to some SIMD instructions which may specify a vector length (i.e. the combined width of the portions of a data value to be processed) which matches or is less than the width of one of the data processing clusters and also to other SIMD instructions which may specify a vector length which is greater than the width of one of the data processing clusters. To give just one example of this, the apparatus may be configured in accordance with the Arm architecture provided by Arm Limited, of Cambridge, UK, which provides instruction sets which may include Neon SIMD instructions and which may include SVE (Scalable Vector Extension) instructions. When executed on an apparatus which supports a maximum vector width of 256 bits there may therefore be instructions in this example context which specify 256-bit vector lengths, 128-bit vector lengths, and vector lengths which are less than 128-bit. Although the first and second data processing clusters of the present apparatus in combination provide a set of data processing lanes with a combined width which can be used in parallel to execute instructions specifying the maximum vector length (the combined width) of the apparatus, the present techniques propose that this is not automatically done. Thus, the issue circuitry of the apparatus, in response to receipt of a decoded SIMD instruction specifying a vector length which is more than the first width, does not automatically issue a first part of the decoded SIMD instruction to the first data processing cluster for execution and a second part of the decoded SIMD instruction to the second data processing cluster for execution. Instead, a dynamic approach to the issue target selection for the second part of the decoded SIMD instruction is taken, in dependence on a dynamic performance condition. Thus whilst the first part of the decoded SIMD instruction is always issued to the first data processing cluster for execution, under some circumstances the second part of the decoded SIMD instruction is indeed issued to the second data processing cluster for execution, whilst under other circumstances the second part of the decoded SIMD instruction is also issued to the second data processing cluster for execution. Since the first part of the decoded SIMD instruction is always issued to the first data processing cluster for execution, the first and second parts of the decoded SIMD instruction are then executed in series by the first data processing cluster. This could mean that the first part is executed followed by the second part, or vice versa. This allows a more flexible approach to the operation of the apparatus to be followed, in particular where a choice can be made about when to make use of the second data processing cluster in dependence on the dynamic performance condition. The dynamic performance condition may take a variety of forms, but could for example be a defined performance mode of the apparatus. For example, when the apparatus is currently defined to be in a high performance mode, the second data processing cluster can be used when suitable corresponding instructions are received. Conversely, for example, when the apparatus is defined to be in a low performance (e.g. power saving) mode, use of the second data processing cluster can be dispensed with, and when instructions are received which define a vector length which is greater than the width of the first data processing cluster the instruction can be executed in two parts in series.

In principle the apparatus might be arranged to issue instructions which specify a vector length which is no more than the first width by issuing these instructions to either the first data processing cluster or to the second data processing cluster for execution, however in some embodiments the issue circuitry is responsive to receipt of a decoded SIMD instruction specifying a vector length which is no more than the first width: to issue the decoded SIMD instruction specifying a vector length which is no more than the first width to the first data processing cluster for execution. Always issuing such instructions to the first data processing cluster for execution can simplify the control circuitry and configuration of the apparatus, since only the first data processing cluster must be capable of executing them.

In some embodiments the first data processing cluster belongs to a first power domain and the second data processing cluster belongs to a second power domain. This can enable each of the clusters to be treated differently with respect to their power monitoring and power control.

As mentioned above, one example basis for the evaluation of the dynamic performance condition might be a current performance mode of the apparatus. Whilst in a high performance mode it is beneficial to have all parts of the apparatus operational in order to improve performance, in a lower performance mode it may be beneficial to disable some parts of the apparatus, for example in order to reduce power consumption. Accordingly in some embodiments the dynamic performance condition is a not-fully-powered state of the second power domain. Hence, under circumstances when the second cluster is either off or at least not fully powered (e.g. still powering up or down), just the first cluster is used.

The present techniques recognise that in order to allow the first data processing cluster to execute instructions which specify a vector length which is wider than the combined lanes of the first data processing cluster, although by the nature of SIMD processing many instructions can run independently on the different lanes of a cluster, instructions may also be encountered which require some data communication between the lanes (potentially across the full vector length), such as permutation instructions. Various features may be provided to support this, but in some embodiments the first data processing cluster has access to a first register file and a second register file, the second data processing cluster has access to the second register file, and the first register file and the second register file belong to the first power domain. In other words both the first and the second data processing cluster have access to the second register file, which is within the first power domain. Hence were the second power domain to be powered down, or at least transitioned to a lower, non-functional power state, the data in the second register file nevertheless remains accessible to the first data processing cluster.

Power control over the second power domain may be provided in various ways, and in particular may be provided by a hardware component of the apparatus, by a separate (external) hardware device, or may be under software control. Hence in some embodiments the apparatus further comprises power domain control circuitry responsive to a power-restriction signal to power down the second power domain. In some embodiments the power-restriction signal is generated under control of performance management circuitry. In some embodiments the power-restriction signal is generated under control of software.

The present techniques have further recognised that in the context of being able to switch the second data processing cluster off when current performance specifications do not require it and to switch it back on when new performance specifications require its use, the process of turning the second data processing cluster on can typically take a significant period of time (on the timescale of data processing actions). For example in a contemporary apparatus of this type, such a power-up procedure may for example take 1000 to 10,000 cycles. To stall data processing for this period would be undesirably disruptive and hence in some embodiments the issue circuitry and the power domain control circuitry are arranged to perform a coordinated power-on procedure for the second domain, wherein in the coordinated power-on procedure the power domain control circuitry causes the dynamic performance condition to have the first state until the second domain is fully powered and when the second domain is fully powered to cause the dynamic performance condition to have the second state. In other words, whilst the second domain (and in particular the second data processing cluster within it) is still powering up, all decoded instruction parts continue to be issued to the first data processing cluster. Only once the second domain (and the second data processing cluster) is fully powered, are decoded instruction parts issued to both the first and second data processing cluster as appropriate. This enables instruction execution to continue despite the powering up (or indeed down) taking place and the power mode switching is transparent to the executed software, with only the performance changes that result being visible.

The first and second data processing clusters may have separate register files, yet in some embodiments the first data processing cluster has access to a first register file and a second register file, and the second data processing cluster has access to the second register file.

One approach to this shared access to the second register file is provided by some embodiments, wherein the first register file and a second register file together form a combined register file, and wherein bits of a less significant half of the combined register file represent the first register file and bits of a more significant half of the combined register file represent the second register file. Thus for example the combined register file may provide data values for processing which match the maximum vector length which is handled by the apparatus. In this circumstance, when execution of an instruction which makes use of the full maximum vector length is shared between the first and second data processing cluster, the first data processing cluster accesses the less significant half of the combined register file and the second data processing cluster accesses the more significant half of the combined register file. To give just one example, where the maximum vector length supported is 256-bit, a 256-bit register file may be accessed by both the first and data processing cluster, with the first data processing cluster treating bits [0:127] as a 128-bit data value to be processed and the second data processing cluster treating bits [128:255] as a 128-bit data value to be processed.

Another approach of the present techniques to support the data access that may be needed which crosses between the data processing clusters is provided by some embodiments wherein the first data processing cluster has access to a first register file and the second data processing cluster has access to a second register file, and the apparatus is responsive to initiation of a switch of the dynamic performance condition from the second state to the first state to copy content of the second register file to storage accessible to the first data processing cluster. This allows the first data processing cluster to continue data processing activities in response to a continuing stream of instructions, building on the data processing which was carried out when the dynamic performance condition was in the second state.

Such copying of registers may be implemented in various ways, but in some embodiments the first data processing cluster is arranged to perform the SIMD processing by reference to a set of architectural registers, and the apparatus comprises register renaming circuitry to remap the set of architectural registers to a first subset of a first set of physical registers, wherein the apparatus is responsive to the initiation of the switch of the dynamic performance condition from the second state to the first state to copy content of the second register file to a second subset of the first set of physical registers. The present techniques have recognised that where such copying of registers is required, existing register renaming techniques may be used to support this.

The content copied may take various forms depending on the apparatus requirements and the nature of the instructions which it may encounter (and in particular their corresponding vector lengths), but in some embodiments the content of the second register file copied has the second width. Thus the full width of the second plurality of data processing lanes which form the second data processing cluster may be copied, enabling the first data processing cluster to continue any data processing which the second data processing cluster has carried out before the copying took place.

In one example embodiment described herein there is a method of data processing comprising: performing single instruction multiple data (SIMD) processing in a first data processing cluster comprising a first plurality of data processing lanes, wherein the first plurality of data processing lanes has a first width; performing SIMD processing in a second data processing cluster comprising a second plurality of data processing lanes, wherein the second plurality of data processing lanes has a second width; issuing decoded instructions to at least one of the first data processing cluster and the second data processing cluster; and in response to receipt of a decoded SIMD instruction specifying a vector length which is more than the first width: issuing a first part of the decoded SIMD instruction having the first width to the first data processing cluster for execution; selecting an issuance target for a second part of the decoded SIMD instruction having a remainder width of the vector length less the first width in dependence on a dynamic performance condition, wherein when the dynamic performance condition has a first state the issuance target is the first data processing cluster and when the dynamic performance condition has a second state the issuance target is the second data processing cluster; and scheduling the first and second parts of the decoded SIMD instruction in series when the issuance target is the first data processing cluster.

In one example embodiment described herein there is an apparatus comprising: first means for performing single instruction multiple data (SIMD) processing comprising a first plurality of data processing lanes, wherein the first plurality of data processing lanes has a first width; second means for performing SIMD processing comprising a second plurality of data processing lanes, wherein the second plurality of data processing lanes has a second width; means for issuing decoded instructions to at least one of the first means for performing SIMD processing and the second means for performing SIMD processing; and in response to receipt of a decoded SIMD instruction specifying a vector length which is more than the first width for causing activation of: means for issuing a first part of the decoded SIMD instruction having the first width to the first means for performing SIMD processing for execution; means for selecting an issuance target for a second part of the decoded SIMD instruction having a remainder width of the vector length less the first width in dependence on a dynamic performance condition, wherein when the dynamic performance condition has a first state the issuance target is the first means for performing SIMD processing and when the dynamic performance condition has a second state the issuance target is the second means for performing SIMD processing; and means for scheduling the first and second parts of the decoded SIMD instruction in series when the issuance target is the first means for performing SIMD processing.

Particular embodiments will now be described with reference to the figures.

FIG. 1 illustrates a data processing apparatus 100 in accordance with one embodiment. The apparatus comprises fetch circuitry 102 which retrieves a sequence of instructions for execution (from memory, not illustrated). It will be understood by one of ordinary skill in the art that the illustration of FIG. 1 provides a high level overview of a selection of main components of the data processing apparatus and various further components, even at this high level of abstraction, are not illustrated, this omission being merely for the purpose of clarity of illustration. Furthermore, various interconnections between the illustrated components are also not illustrated for the same purpose of clarity. Fetched instructions are passed to the decode circuitry 104 and then to the renaming circuitry 106. Thereafter the issue circuitry 108 issues decoded instructions to the processing clusters 110, 112 for execution. In fact, as will be discussed in more detail with reference to the figures which follow, the data processing apparatus 100 is capable of executing single instruction multiple data (SIMD) instructions and the decoding circuitry 104 is arranged to decode such SIMD instructions for issuance to the processing clusters in a number of ways. For example a SIMD instruction may be decoded into more than one micro-op (where micro-ops may also be referred to as decoded instruction parts herein) and these decoded SIMD instructions can be issued by the issue circuitry 108 to either the processing cluster 110 or the processing cluster 112. In other instances a SIMD instruction may be decoded into a single micro-op and this single micro-op can be issued by the issue circuitry 108 to both the processing cluster 110 and the processing cluster 112 at the same time. Each of the processing clusters 110, 112 comprises a number of parallel processing lanes in order to enable it to carry out the SIMD processing on portions of a data value specified by a SIMD instruction in each data processing lane of the processing cluster in parallel. In order to support this processing each processing cluster, in this example, has access to its own register cache and register file, shown in FIG. 1 as the circuitry 114, 116 for processing cluster 110 and circuitry 118, 120 for processing cluster 112. It should be noted that in other examples a single register bank is provided for each processing cluster. FIG. 1 also illustrates a performance condition 122, which may for example be a data value held in a storage component of the data processing system. As illustrated each processing cluster 110, 112 can modify this performance condition and it may also be modified on the basis of other system information. The performance condition 122 is provided to the decode circuitry 104, the rename circuitry 106 and the issue circuitry 108 and can affect the manner in which these components carry out their operations. Most notably, for a given SIMD instruction received and decoded into a first part and a second part, the issue circuitry 108 will issue these parts to the processing clusters 110, 112 in dependence on the current performance condition value 122. Where the performance condition value 122 is modifiable at runtime this therefore represents a dynamic performance condition on the basis of which the issuance target for respective parts of a decoded SIMD instruction is chosen. For example, under some circumstances the issue circuitry 108 may always issue a first part of the decoded SIMD instruction to the processing cluster 110, whilst it will either issue a second part of the decoded SIMD instruction to the processing cluster 112 or also to the processing cluster 110 depending on the current dynamic performance condition, i.e. the current value of the performance condition 122. It will be understood therefore that when the two parts of the decoded SIMD instruction are issued to the processing clusters 110, 112 at the same time, these two parts can then proceed through the respective processing clusters in parallel. By contrast, when both parts of the decoded SIMD instruction are issued to the processing cluster 110 they are scheduled to be processed in series. The operation of the decoding circuitry 104 can also change in dependence on the current performance condition value 122. For some SIMD instructions received and decoded into a first part and a second part, the micro-op (or micro-ops) into which the SIMD instruction is decoded need not be affected by whether both or only one of the processing clusters 110, 112 is operational. This is due to the lane-based SIMD processing in these instances being largely independent on a lane-by-lane (and hence also cluster-by-cluster) basis. However for some other SIMD instructions received and decoded into a first part and a second part, the micro-op (or micro-ops) into which the SIMD instruction is decoded does (or do) vary, i.e. the operation of the decoding circuitry 104 changes in dependence on the current performance condition value 122. One example of this is for SIMD instructions which cause permutation operations, namely the transposition of data values between the data processing lanes. The implementation of these instructions varies a little depending on whether both or only one of the processing clusters 110, 112 is operational. For example, where one target data processing lane requires a data value from another source data processing lane, the implementation of the retrieval of the data value from the source data processing lane will differ depending on whether that data processing lane is concurrently active (in the case when both data processing clusters are active in parallel) or instead that data processing lane is processed in series (by the same data processing cluster) with the target data processing lane.

Figure 2:
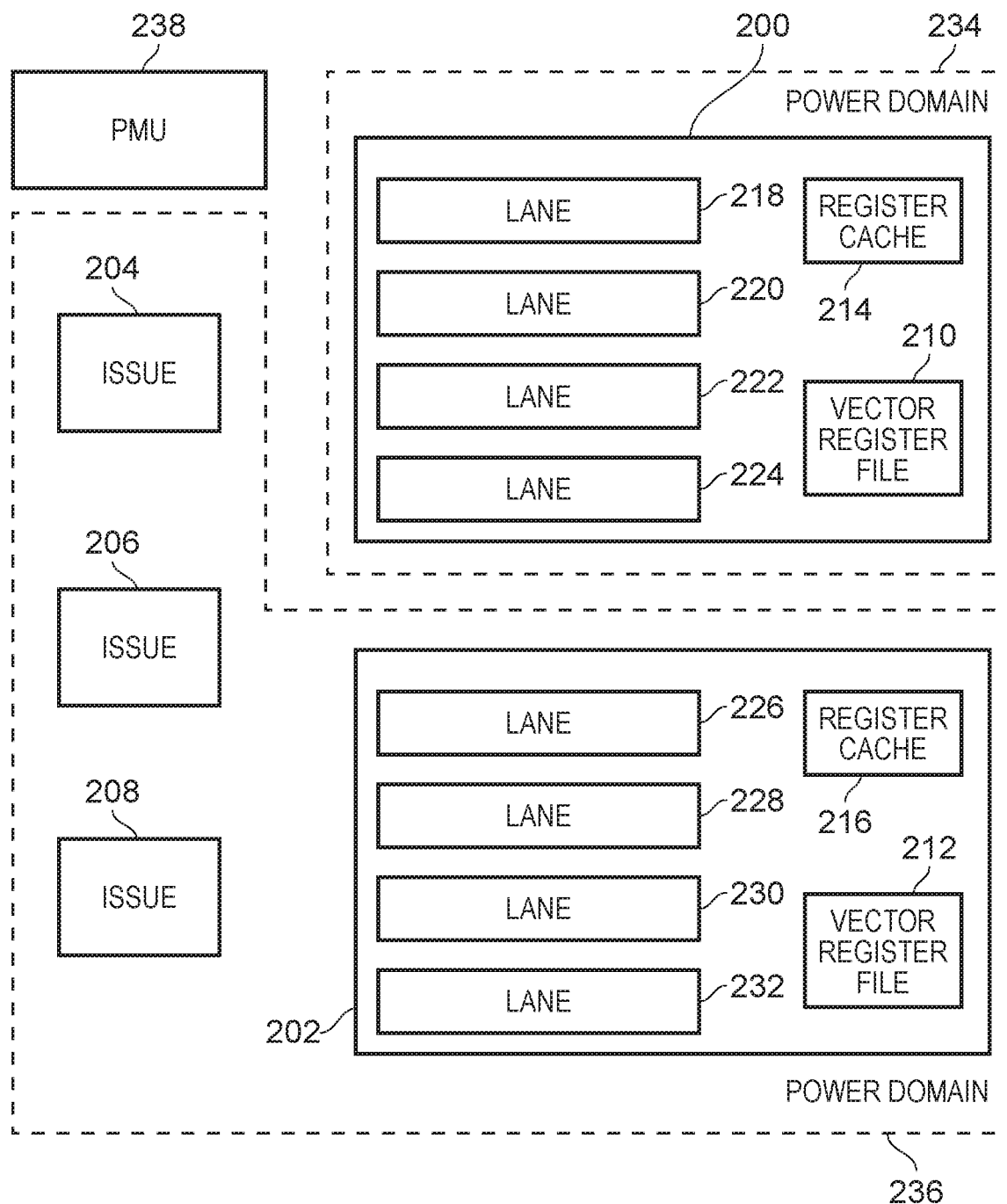
FIG. 2 schematically illustrates two processing clusters each comprising four lanes and each belonging to a different power domain in one example embodiment.

FIG. 2 schematically illustrates some components of a data processing apparatus in one embodiment. Two data processing clusters 200, 202 are illustrated. Further, in this example embodiment there are three sets of issue circuitry 204, 206, 208 which operate in parallel to one another and can each issue decoded instructions (or decoding instruction parts) to either or both of the processing clusters 200, 202. As in the example of FIG. 1 each of the data processing clusters has access to a vector register file 210, 212 and also to a register cache 214, 216 in order to support the SIMD data processing which each processing cluster is configured to perform. Each cluster comprises a set of data processing lanes 218, 220, 222 and 224, and 226, 228, 230, 232 respectively. FIG. 2 also illustrates, by means of the dashed lines 234, 236 that there are two power domains defined for this portion of the data processing apparatus, one of which only encompasses the processing cluster 200 (i.e. power domain 234), whilst the other encompasses both the processing cluster 202 and the three instances of issue circuitry 204, 206, 208 (i.e. power domain 236). Control over these power domains is maintained by the power management unit 238. It will be noticed that in this example the PMU 238 lies outside both the power domain 234 and the power domain 236 in that it has its own power supply enabling it to freely control both power domain 234 and power domain 236 without this affecting its own power supply. In other examples the PMU 238 could be within the power domain 236 and thus (like the other components in power domain 236) be "always-on", whereas the status of the power domain 234 depends on the PMU control. The PMU 238 may be a component of the data processing apparatus itself, for example such as a further component (not illustrated) in the example embodiment of FIG. 1, or may lie entirely outside the data processing apparatus. Where the issue circuitry 204, 206, 208 are comprised within the power domain 236, when the power domain 236 is enabled, but the power domain 234 is not fully powered (e.g. is fully off, in a low power mode, or in a power transition) the issue circuitry can only issue decoded instruction (parts) to the processing cluster 202. This may for example represent a low power mode of the data processing apparatus in which the additional performance available when processing cluster 200 is enabled is dispensed with to gain the advantage of the lower power consumption of the apparatus when this cluster is not fully powered. The static power which is lost when the processing cluster 200 is fully powered, yet not used, is not insignificant and therefore power saving advantages can be gained by powering down power domain 234. Nevertheless, the present techniques recognise that in an example embodiment such as that shown in FIG. 2, where each data processing cluster has its own register cache and vector register file, steps may need to be taken prior to powering down power domain 234, such that content from the vector register file 210 in particular can remain available to the data processing cluster 202 whilst data processing continues in the lower power mode with only the power domain 236 enabled. This is due to the fact that the full architectural state of the data processing apparatus which has been maintained across the register banks of the two data processing clusters for vector lengths which extend across both data processing clusters needs to continue to be accessible when only one data processing cluster is powered and active. Hence, in order to support such a low power mode the data processing apparatus is arranged, prior to entering the low power mode, to copy content from the vector register file 210 into a storage location accessible to the data processing cluster 202, for example into its register cache 216 or its vector register file 212.

Figure 3:
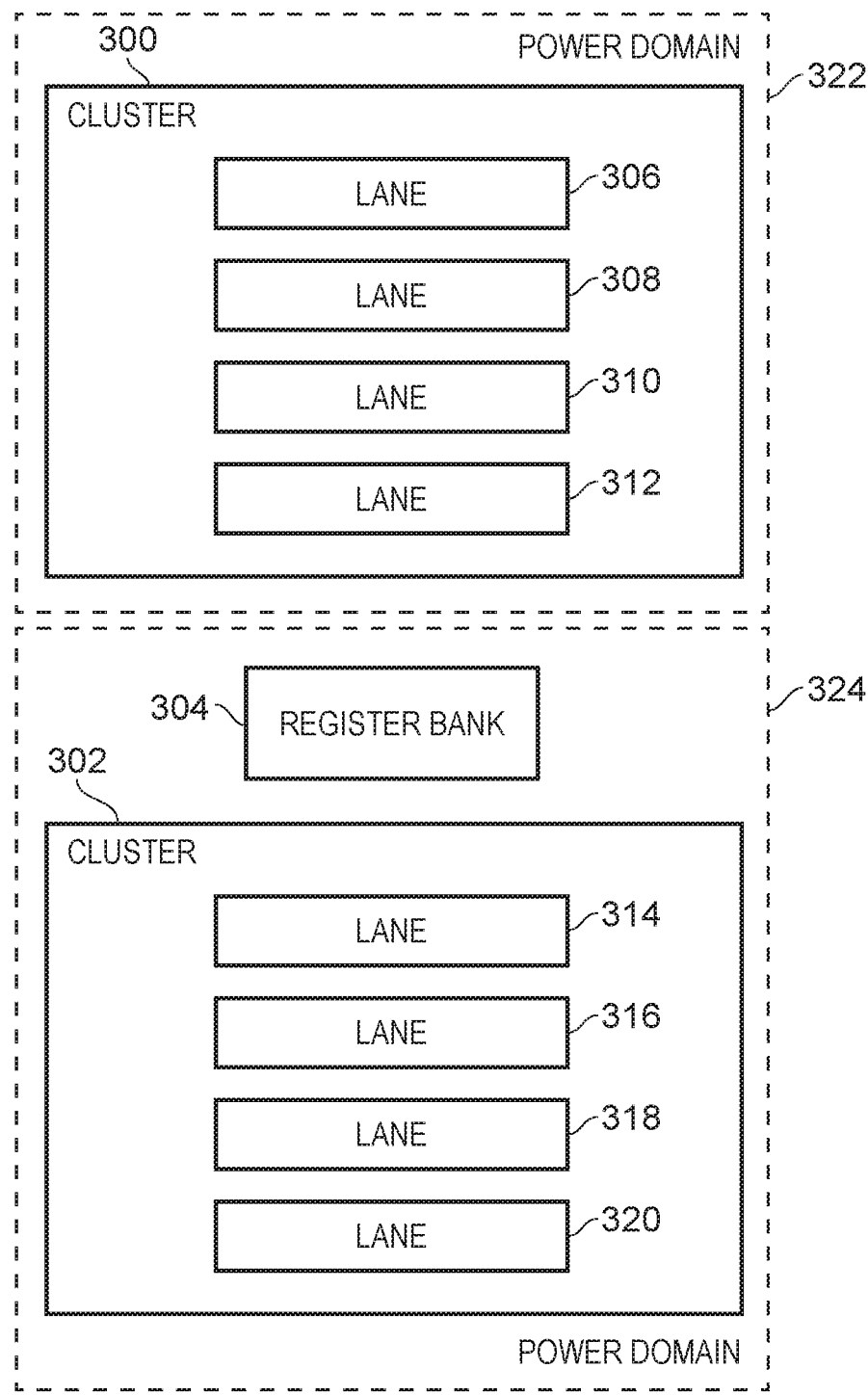
FIG. 3 schematically illustrates two processing clusters each comprising four lanes and each belonging to a different power domain, which share a register bank in one of the power domains in one example embodiment.

FIG. 3 schematically illustrates another example embodiment of the execution stage of a data processing apparatus according to an example embodiment comprising data processing cluster 300 and data processing cluster 302. As in the example of FIG. 2 each data processing cluster comprises four parallel data processing lanes namely lanes 306, 308, 310, 312 for data processing cluster 300 and lanes 314, 316, 318 and 320 for data processing cluster 302. Note that in this example embodiment only one register bank 304 is provided, to which both data processing clusters 300, 302 have access. Note further that register bank 304 lies within power domain 324 alongside data processing cluster 302, whilst data processing cluster 300 is within its own power domain 322. This means that when both power domains 322, 324 are enabled and the apparatus is in a high performance mode, both data processing clusters make access to the register bank 304, enabling data to be passed between any data processing lanes of either data processing cluster. However, when the apparatus is not in the high performance mode, e.g. is in its low power mode, or transitioning into it, the data processing cluster 302 can continue its data processing operations, making accesses to data values in the register bank 304 which can include data values previously maintained and accessed therein by the data processing cluster 300. Thus the fact that the data processing apparatus is not in its high performance mode is transparent to the execution of the program and only the reduced performance is visible. Control over the enabling and disabling of the power domains 322 and 324 in the example of FIG. 3 may be under the control of a hardware component such as the PMU 238 shown in FIG. 2, or may alternatively be under software control.

Figure 4:
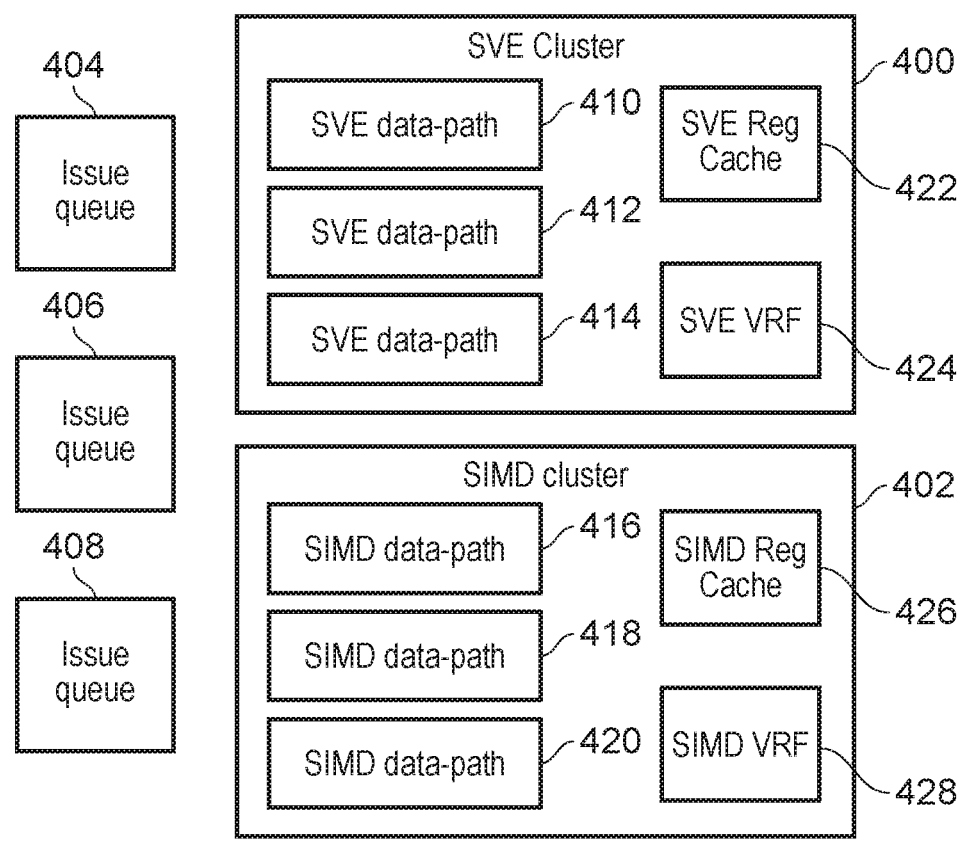
FIG. 4 schematically illustrates two processing clusters each comprising three lanes in one example embodiment.

FIG. 4 schematically illustrates a further example embodiment of a data processing apparatus in one example. Two data processing clusters 400, 402 are shown to which issue queues 404, 406, 408 issue decoded instructions (or decoded instruction parts) as appropriate. In the example of FIG. 4 only three data paths (lanes) 410, 412, 414 are shown for cluster 400 and similarly only three data paths (lanes) 416, 418, 420 are shown for cluster 402. Note further that the cluster 400 is labelled as an SVE cluster, whilst the cluster 402 is labelled as a SIMD cluster. Accordingly the respective data paths are SVE data paths and SIMD data paths. Further, the SVE cluster 400 comprises an SVE register cache 422 and a SVE vector register file (VRF) 424. Similarly, the SIMD cluster 402 comprises a SIMD register cache 426 and a SIMD vector register file (VRF) 428. These acronyms are references to the fact that the example given in FIG. 4 corresponds to an example apparatus configured in accordance with an architecture provided by ARM Limited, Cambridge, UK, where SVE refers to the Scalable Vector Extension for ARM architectures provided. SIMD of course refers to single instruction multiple data as explained above, and in this example of an apparatus configured according to the ARM architecture, the SIMD cluster 402 is arranged to execute Neon instructions. The data processing clusters (and their constituent data paths) of FIG. 4 are arranged to execute instructions with vector lengths of 256 bits. Thus together the SVE data paths of the SVE cluster 400 have a combined width of 128 bits and the SIMD data paths of the SIMD cluster 402 have a combined width of 128 bits. Accordingly, in combination, the two data processing clusters 400, 402 have a full width of 256 bits. Accordingly, when the apparatus executes Neon instructions these are decoded and issued to the SIMD cluster 402. However when a SVE instruction is encountered with a vector length of 128 bits this is also executed in the SIMD cluster 402, whilst when a SVE instruction is encountered with a vector length of 256 bits, the 128 bottom bits of the SVE instructions are executed on the SIMD cluster 402, whilst according to the present techniques, the top 128 bits of the vector can either be executed in the SVE cluster 400 or the SIMD cluster 402 depending on a dynamic performance condition of the apparatus. This dynamic performance condition is determined such that when the issue queues 404, 406, 408 issue a micro-op (decoded instruction part) to the data paths for execution, a micro-op corresponding to the bottom 128 bits of a SVE instruction of a vector length of 256 bits is issued to the SIMD data paths of the SIMD cluster 402, whilst in dependence on the dynamic performance condition, a micro-op corresponding the top 128 bits of the vector is either issued to the SVE data paths of the SVE cluster 400 or the SIMD data paths of the SIMD cluster 402. In the latter case the micro-ops are naturally issued in series, whereas in the former case the micro-ops can be issued in parallel. It should be noted in the latter case (of micro-ops being issued in parallel) that this could in fact involve the same single micro-op being issued to both clusters (and hence being issued from a single issue queue entry). In other cases, two distinct micro-ops may be issued in parallel (from separate issue queue entries in separate issue queues) to the clusters.

Figure 5A:
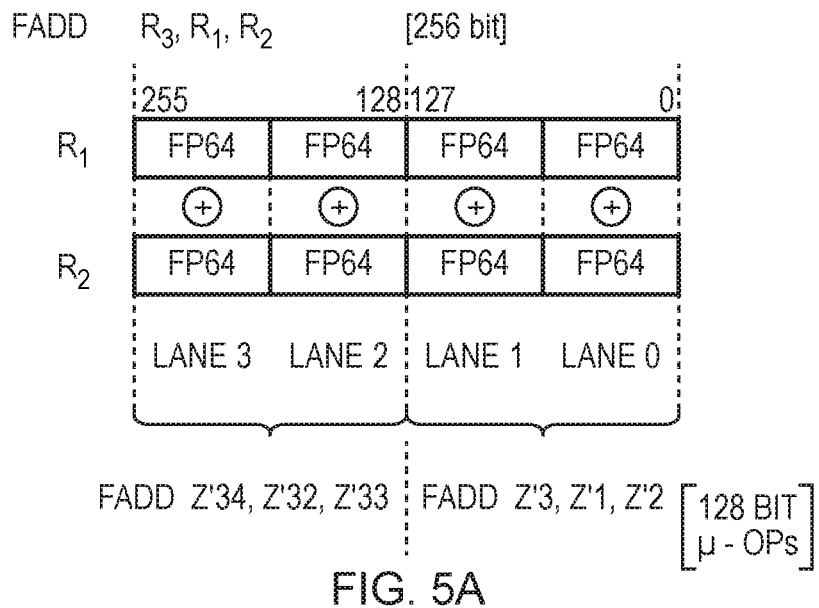
FIG. 5A shows an example SIMD instruction and shows how portions of the registers to which the SIMD instruction refers are processed in parallel lanes in one example embodiment.
Figure 5B:
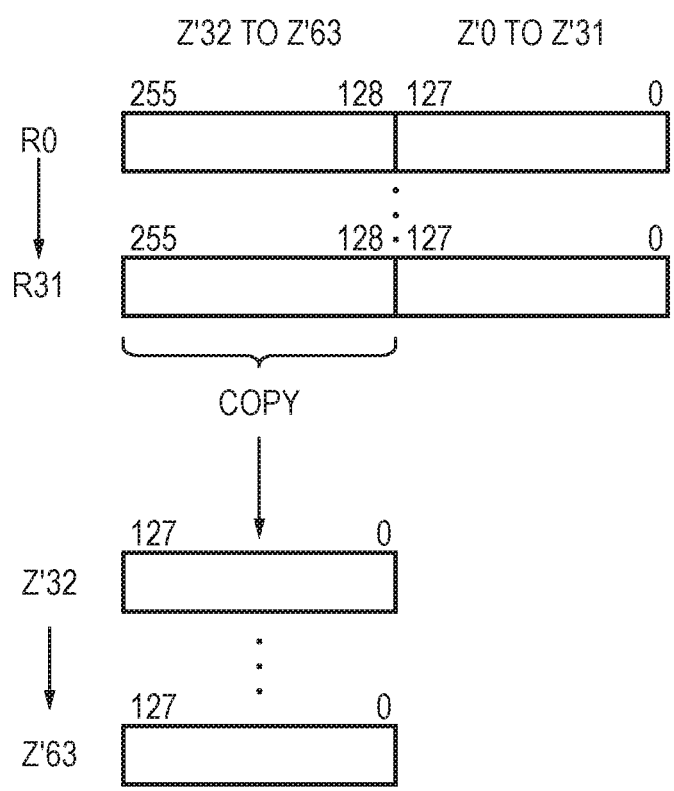
FIG. 5B schematically illustrates a set of 256-bit registers, which are accessed in lower and upper halves to provide two sets of 128-bit registers in one example embodiment.

FIG. 5A shows an example of the manner in which a vector processing instruction using a 256-bit vector length is split into two 128-bit micro-ops for the purposes of allocating those micro-ops between the data processing clusters. The example is given of a floating point add instruction (FADD) which when translated into micro-ops for execution in the data paths of the data processing clusters corresponds to two 128-bit FADD instructions. Thus within the data processing lanes (paths) of the data processing clusters the two operands R1, R2 are handled across the lanes as four 64-bit floating point (FP64) values. Correspondingly, in the lower part of FIG. 5A it can be seen that the registers R1, R2, R3 are translated into references to six substitute registers namely registers Z'1, Z'2, Z'3 and Z'32, Z'33, Z'34. The labelling of these registers is explained further with reference to FIG. 5B, where it can be seen that a set of 32 architectural registers which may be referred to as R0 to R31 can also be referenced in two halves as a set of registers Z'0 to Z'31 and Z'32 to Z'63. Furthermore, FIG. 5B illustrates an example copying procedure, which the apparatus may perform before leaving a high performance mode, if the arrangement of the apparatus is such that this copying is required in order to ensure that content available to one data processing cluster remains available to the other data processing cluster once the high performance mode has been left. For example this can be the case for the example embodiment of FIG. 2, where the register cache 214 and the vector register file 210 will power down with the cluster 200 when power domain 234 is transitioned to a non-fully powered mode. Similarly this may be required in the example embodiment of FIG. 4, where the register cache 422 and the vector register file 424 will power down with the cluster 400. In such embodiments it should therefore be understood that when both clusters are operating reference to registers Z'32 to Z'63 accesses a set of 32 128-bit registers (A) in one cluster and reference to registers Z'0 to Z'31 accesses a set of 32 128-bit registers in the other cluster. Equally, reference to the registers referred to as R0 to R31 (which are perceived as a set of 32 256-bit registers) is therefore split across the two clusters. When only one cluster is operating (e.g. in a low power mode) reference to registers Z'32 to Z'63 accesses a set of 32 128-bit registers (B) in the operational cluster and reference to registers Z'0 to Z'31 accesses the same set of 32 128-bit registers in that cluster that was accessed in the full-power mode (both clusters operating). Hence when only one cluster is operating reference to the registers referred to as R0 to R31 (which are perceived as a set of 32 256-bit registers) is therefore supported by two sets of 32 128-bit registers in the operational cluster. To achieve this, as indicated in the figure, prior to one cluster ceasing operation, the content of the registers Z'32 to Z'63 (A) in the about-to-cease-operation cluster is copied into the registers Z'32 to Z'63 (B) in the will-continue-operation cluster. It should further be noted that the particular labelling of these sets of registers is arbitrary and given here by way of example only. The specific sets of physical registers (and their labels) used to support the three sets of 32 128-bit registers discussed in this example may vary, for example as are preferable given the architectural/physical register naming conventions or register renaming conventions of a particular apparatus.

Figure 6:
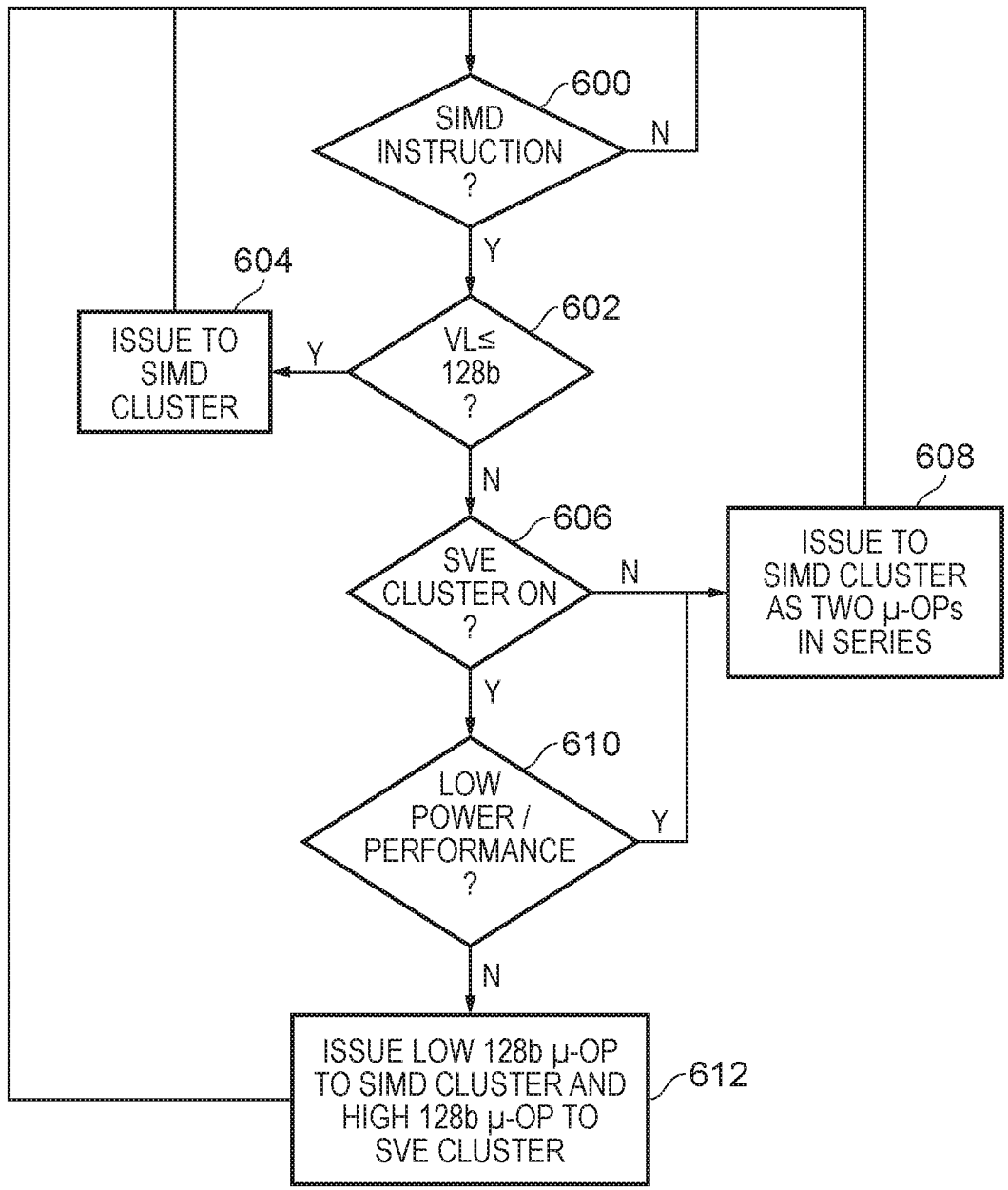
FIG. 6 is a flow diagram showing a sequence of steps which are taken when operating a data processing apparatus according to the method of one example embodiment.

FIG. 6 is a flow diagram which represents steps taken when operating a data processing apparatus such as that given in the example embodiment of FIG. 4. The flow can be configured to begin at step 600 where it is determined if a SIMD instruction has been received. If not the flow loops on itself at step 600 until this is true. The flow then proceeds to step 602 where it is determined if the vector length specified by this SIMD instruction is less than or equal to 128 bits (step 604). If it is then this instruction, once decoded, is issued to the SIMD cluster. The flow then returns to step 600. However, if the specified vector length is greater than 128 bits, then from step 602 the flow proceeds to step 606 where it is determined if the SVE cluster is currently fully powered. If it is not the flow proceeds to step 608 where the decoded SIMD instruction is issued to the SIMD cluster as two micro-ops in series. Thereafter the flow returns to step 600. If however at step 606 it is determined the SVE cluster is fully powered then the flow proceeds to step 610 where it is determined if, despite the SVE cluster currently being fully powered, a lower power or performance mode is specified. This being the case then the flow proceeds to step 608. If, however, the apparatus is currently in its high performance mode then the flow proceeds to step 612 where the bottom 128 bits of the vector are processed by means of a micro-op issued to the SIMD cluster whilst the top 128 bits of the vector are processed by a micro-op issued to the SVE cluster. It should be noted that although the example of FIG. 6 gives a specification where two 128 bit micro-ops are issued at step 612 in cases where the vector length is greater than 128 bits but less than 256 bits then a corresponding micro-op with a lesser width is issued to the SVE cluster. From step 612 the flow returns to step 600.

Figure 7:
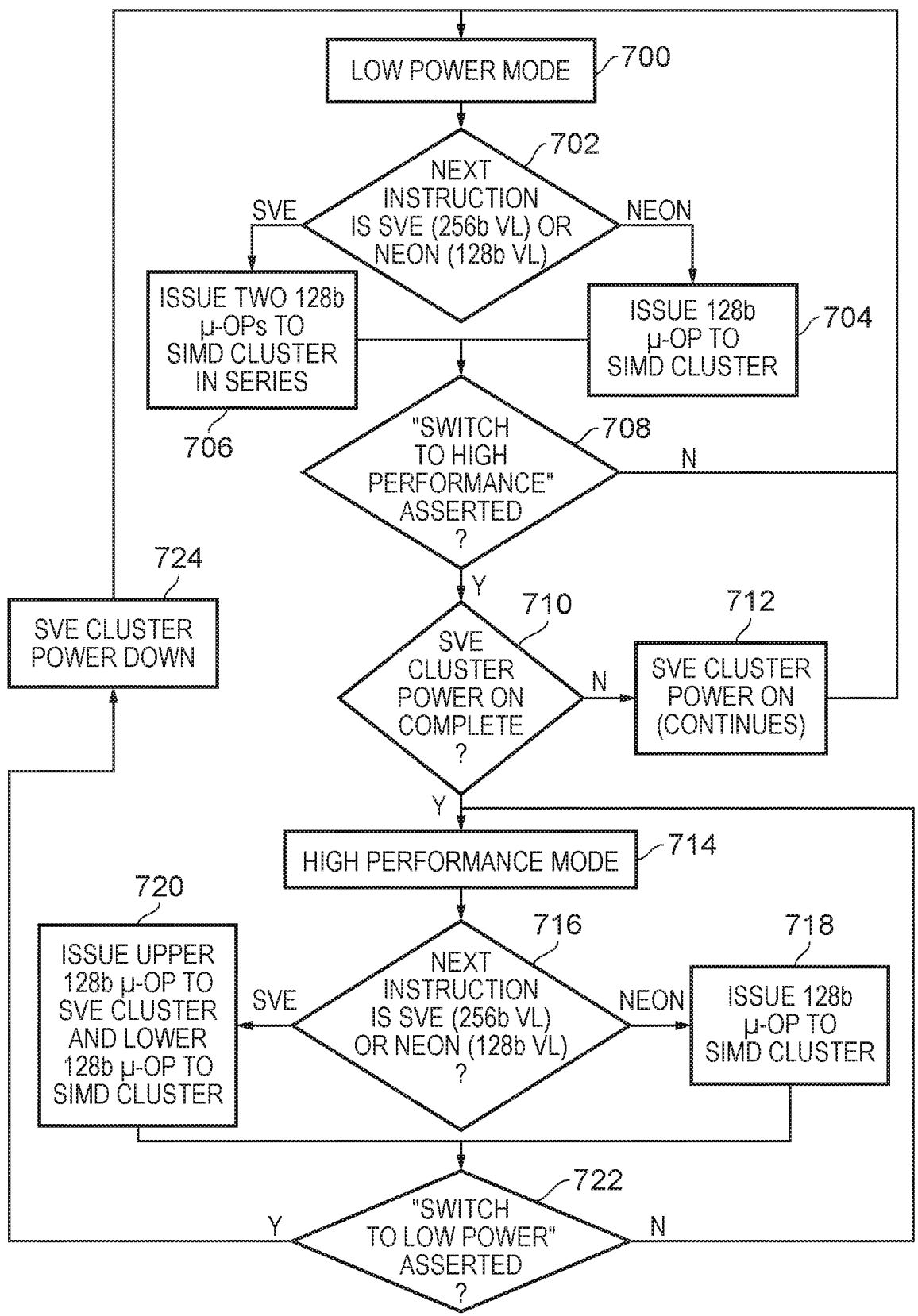
FIG. 7 is a flow diagram showing a sequence of steps which are taken when operating a data processing apparatus according to the method of one example embodiment.

FIG. 7 shows another example set of steps which are carried out in the method of one example embodiment, which may for example operate an apparatus some components of which are showing in the example of FIG. 4. The flow may be considered to begin at step 700 where the apparatus is currently in its low power mode. It is then determined at step 702 whether the next instruction encountered is SVE (having a 256-bit vector length) or Neon (having a 128-bit vector length). It should be noted that for the purposes of the steps discussed in FIG. 7 it is assumed that all instructions are either SVE or Neon, but it should be appreciated that the execution pipelines of the apparatus may be capable of also performing execution of instructions which are not from the SVE or Neon instruction sets, for example by means of a further execution unit other than the SVE or SIMD clusters (i.e. not explicitly illustrated in the example of FIG. 4). When it is determined that the instruction is Neon then the flow proceeds to step 704 where a corresponding 128-bit micro-op is issued to the SIMD cluster for execution. Conversely, if it is determined that the instruction is SVE, then two 128-bit micro-ops are issued to the SIMD cluster in series step 706. From either step 704 or step 706 the flow proceeds to step 708 where it is determined if a "switch to high performance" signal has been asserted. Whilst this is not the case, the flow returns to step 700. However, when this is true the flow proceeds to step 710, where it is determined if a power on procedure for the SVE cluster is now complete. If not, then at step 712 the SVE cluster power on continues (on the assumption that on the timescale of encountering another instruction it will not complete). From step 712 the flow returns to step 700, it being understood that until the SVE cluster is fully powered on the apparatus is considered to still be in its low power mode. However, if at step 710 it is determined that the SVE cluster is now complete then as represented by step 714 the apparatus is now in its high performance mode. Thereafter, at step 716 it is determined if the next instruction encountered is a SVE instruction specifying a 256-bit vector length or a Neon instruction specifying a 128-bit vector length. If the instruction is Neon then at step 718 a 128-bit micro-op is issued to the SIMD cluster. If however the instruction is SVE then at step 720 a micro-op corresponding to the upper 128 bits of the vector is issued to the SVE cluster, whilst a micro-op corresponding to the lower 128 bits of the instruction is issued to the SIMD cluster. Then from either step 718 or step 720 the flow proceeds to step 722 where it is determined if a "switch to low power" signal has been asserted. If it has not the flow returns to step 714 and the apparatus remains in its high performance mode. If however, the "switch to low power" signal is asserted then the flow proceeds to step 724 where SVE cluster power down begins and the flow continues (immediately) to step 700, i.e. as soon as the SVE cluster power down begins the apparatus is considered to be in its lower power mode.

In brief overall summary apparatuses and methods of data processing are disclosed. An apparatus comprises two data processing clusters each having multiple data processing lanes to perform single instruction multiple data (SIMD) processing. Decoded instructions are issued to at least one of the two data processing clusters. A decoded SIMD instruction specifying a vector length which is more than the width of the data processing lanes of the first data processing cluster has a first part issued to the first data processing cluster for execution. An issuance target for a second remaining part of the decoded SIMD instruction is selected in dependence on a dynamic performance condition. When the dynamic performance condition has a first state the issuance target is the first data processing cluster and when the dynamic performance condition has a second state the issuance target is the second data processing cluster. When the issuance target is the first data processing cluster, to schedule the first and second parts of the decoded SIMD instruction in series.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:
1. Apparatus comprising:
a first data processing cluster arranged to perform single instruction multiple data (SIMD) processing comprising a first plurality of data processing lanes, wherein the first plurality of data processing lanes has a first width;
a second data processing cluster arranged to perform SIMD processing comprising a second plurality of data processing lanes, wherein the second plurality of data processing lanes has a second width;
issue circuitry to issue decoded instructions to at least one of the first data processing cluster and the second data processing cluster,
wherein the issue circuitry is responsive to receipt of a decoded SIMD instruction specifying a vector length which is more than the first width:
to issue a first part of the decoded SIMD instruction having the first width to the first data processing cluster for execution;
to select an issuance target for a second part of the decoded SIMD instruction having a remainder width of the vector length less the first width in dependence on a dynamic performance condition,
wherein when the dynamic performance condition has a first state the issuance target is the first data processing cluster and when the dynamic performance condition has a second state the issuance target is the second data processing cluster; and
when the issuance target is the first data processing cluster, to schedule the first and second parts of the decoded SIMD instruction in series.
2. The apparatus as claimed in claim 1, wherein the issue circuitry is responsive to receipt of a decoded SIMD instruction specifying a vector length which is no more than the first width:
to issue the decoded SIMD instruction specifying a vector length which is no more than the first width to the first data processing cluster for execution.

3. The apparatus as claimed in claim 1, wherein the first data processing cluster belongs to a first power domain and the second data processing cluster belongs to a second power domain.

4. The apparatus as claimed in claim 3, wherein the dynamic performance condition is a not-fully-powered state of the second power domain.

5. The apparatus as claimed in claim 3, wherein the first data processing cluster has access to a first register file and a second register file, the second data processing cluster has access to the second register file, and the first register file and the second register file belong to the first power domain.

6. The apparatus as claimed in claim 3, further comprising power domain control circuitry responsive to a power-restriction signal to power down the second power domain.

7. The apparatus as claimed in claim 6, wherein the power-restriction signal is generated under control of performance management circuitry.

8. The apparatus as claimed in claim 6, wherein the power-restriction signal is generated under control of software.

9. The apparatus as claimed in claim 6, wherein the issue circuitry and the power domain control circuitry are arranged to perform a coordinated power-on procedure for the second domain, wherein in the coordinated power-on procedure the power domain control circuitry causes the dynamic performance condition to have the first state until the second domain is fully powered and when the second domain is fully powered to cause the dynamic performance condition to have the second state.

10. The apparatus as claimed in claim 1, wherein the first data processing cluster has access to a first register file and a second register file, and the second data processing cluster has access to the second register file.

11. The apparatus as claimed in claim 10, wherein the first register file and a second register file together form a combined register file, and wherein bits of a less significant half of the combined register file represent the first register file and bits of a more significant half of the combined register file represent the second register file.

12. The apparatus as claimed in claim 1, wherein the first data processing cluster has access to a first register file and the second data processing cluster has access to a second register file, and the apparatus is responsive to initiation of a switch of the dynamic performance condition from the second state to the first state to copy content of the second register file to storage accessible to the first data processing cluster.

13. The apparatus as claimed in claim 12, wherein the first data processing cluster is arranged to perform the SIMD processing by reference to a set of architectural registers, and the apparatus comprises register renaming circuitry to remap the set of architectural registers to a first subset of a first set of physical registers,
wherein the apparatus is responsive to the initiation of the switch of the dynamic performance condition from the second state to the first state to copy content of the second register file to a second subset of the first set of physical registers.

14. The apparatus as claimed in claim 12, wherein the content of the second register file copied has the second width.

15. A method of data processing comprising:
performing single instruction multiple data (SIMD) processing in a first data processing cluster comprising a first plurality of data processing lanes, wherein the first plurality of data processing lanes has a first width;
performing SIMD processing in a second data processing cluster comprising a second plurality of data processing lanes, wherein the second plurality of data processing lanes has a second width;
issuing decoded instructions to at least one of the first data processing cluster and the second data processing cluster; and
in response to receipt of a decoded SIMD instruction specifying a vector length which is more than the first width:
   issuing a first part of the decoded SIMD instruction having the first width to the first data processing cluster for execution;
   selecting an issuance target for a second part of the decoded SIMD instruction having a remainder width of the vector length less the first width in dependence on a dynamic performance condition,
wherein when the dynamic performance condition has a first state the issuance target is the first data processing cluster and when the dynamic performance condition has a second state the issuance target is the second data processing cluster; and
   scheduling the first and second parts of the decoded SIMD instruction in series when the issuance target is the first data processing cluster.

16. Apparatus comprising:
first means for performing single instruction multiple data (SIMD) processing comprising a first plurality of data processing lanes, wherein the first plurality of data processing lanes has a first width;
second means for performing SIMD processing comprising a second plurality of data processing lanes, wherein the second plurality of data processing lanes has a second width;
means for issuing decoded instructions to at least one of the first means for performing SIMD processing and the second means for performing SIMD processing; and
in response to receipt of a decoded SIMD instruction specifying a vector length which is more than the first width for causing activation of:
   means for issuing a first part of the decoded SIMD instruction having the first width to the first means for performing SIMD processing for execution;
   means for selecting an issuance target for a second part of the decoded SIMD instruction having a remainder width of the vector length less the first width in dependence on a dynamic performance condition,
wherein when the dynamic performance condition has a first state the issuance target is the first means for performing SIMD processing and when the dynamic performance condition has a second state the issuance target is the second means for performing SIMD processing; and
   means for scheduling the first and second parts of the decoded SIMD instruction in series when the issuance target is the first means for performing SIMD processing.

* * * * *